United States Patent
Yamamoto et al.

(10) Patent No.: US 6,628,890 B1
(45) Date of Patent: Sep. 30, 2003

(54) DIGITAL RECORDING/REPRODUCTION APPARATUS

(75) Inventors: Isao Yamamoto, Ehime (JP); Taisuke Tsurui, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/492,187

(22) Filed: Jan. 27, 2000

(30) Foreign Application Priority Data

Jan. 27, 1999 (JP) .......................................... 11-018875

(51) Int. Cl.$^7$ ................................................. H04N 5/91
(52) U.S. Cl. ............................ 386/68; 386/70; 386/125
(58) Field of Search .............................. 386/68, 70, 95, 386/98, 124, 125, 82, 11, 69; H04N 5/91

(56) References Cited

U.S. PATENT DOCUMENTS

| 5,479,303 A | * | 12/1995 | Suzuki et al. ................. 386/70 |
| 5,596,564 A | * | 1/1997 | Fukushima et al. ............ 386/70 |
| 5,838,872 A | * | 11/1998 | Kawara ....................... 386/68 |
| 5,881,203 A | * | 3/1999 | Fujinami et al. ............. 386/125 |
| 6,002,834 A | * | 12/1999 | Hirabayashi et al. ......... 386/70 |
| 6,075,920 A | * | 6/2000 | Kawamura et al. ........... 386/95 |

FOREIGN PATENT DOCUMENTS

JP          9-247623          9/1997

* cited by examiner

*Primary Examiner*—Vincent Boccio
(74) *Attorney, Agent, or Firm*—Wenderoth, Lind & Ponack, L.L.P.

(57) ABSTRACT

An apparatus for recording/reproducing image data according to MPEG2 system is provided which obtains I picture data reliably and performs trick playback smoothly. In the apparatus, a PES packet including an I picture is detected from video coded data which is recorded on a recording medium 30 by an I picture detection unit 5, an index file of the number of bytes from the start of recording or packet length and the like is created for the PES packet including the I picture data by a index file creation block 7, and the index file is recorded on an A/V-HDD 1 (10). In the trick playback process, a navigation control block 22 obtains the index file, and then obtains the I picture data from the PES packet on the basis of the index file, thereby to perform the trick playback smoothly.

2 Claims, 6 Drawing Sheets

DIGITAL RECORDING/REPRODUCTION APPARATUS

FIELD OF THE INVENTION

The present invention relates to a digital recording/reproduction apparatus for recording/reproducing digital image data which is high-efficiency coded, to/from a random access recording medium such as an A/V-HDD (Audio/Video-Hard Disk Drive).

BACKGROUND OF THE INVENTION

As for digital recording/reproduction apparatus, as a high-efficiency coding method for compressing image data, MPEG2 (Moving Picture Experts Group 2) system attracts attention as technology for realizing digital broadcasting. A stream of images/voices coded according to MPEG2 system comprises elementary streams. In addition, the elementary streams having a common time base are called a program. The elementary stream is divided and incorporated in a data structure of a PES (Packetized Elementary Stream) packet, and the PES packet is further combined with a PES packet having the common time base, to be a program stream. A single bit sequence which is obtained by combining program streams having one or more time bases is called a transport stream and utilized in the digital CS broadcasting and the like.

Since image data coded according to MPEG2 is created on the basis of previous and subsequent image data, information is not complete in only one image. Therefore, the random access is performed with a GOP (Group of Picture) comprising image data of several frames as a unit.

FIG. 6 is a diagram showing arrangement of respective types of images in a GOP according to MPEG2 system. FIG. 7 is a diagram showing an image displaying order by a decoding process according to MPEG2 system.

As shown in FIG. 6, the GOP includes at least one I picture (intra-picture coded image). The I picture is obtained by coding image data corresponding to a picture by DCT (Discrete Cosine Transform) and quantization. The I picture is an image which is coded only by its information and it is generated without using inter-picture prediction. An image every predetermined cycle M starting from this I picture is converted into a P picture (inter-picture prediction coded image) by forward inter-picture prediction coding. These I and P pictures are coded in the same order as that of original images. In addition, each of image data between the I picture and P picture or the P pictures is converted into a B picture (bidirectional prediction coded image) by bidirectional prediction coding using the forward and backward image data (I picture and P picture). The B picture is coded after the I and P pictures are coded.

A PES packet having digital data which is coded according to MPEG2 system is recorded on a recording medium, in the above-described construction.

When the image data is to be decoded, as shown in FIG. 7, the I picture which is coded only by the data within the picture is initially decoded, then the P pictures which are coded using the forward inter-picture prediction are decoded, and finally the B pictures which are coded using the bidirectional prediction are decoded. Reproduction images are reproduced in order of B0, B1, I1, B2, B3, P0, B4, B5, P1, . . . in the direction of time t.

In MPEG2 coding system, since coded data of each I, P, and B picture has a variable length, the position of the I picture which can be decoded only by the data within that picture cannot be specified. A digital recording/reproduction apparatus having data which is coded according to MEPG2 system, recorded on a recording medium such as an A/V-HDD reproduces successively the I, P, and B pictures at the normal playback, whereby image data is reliably reproduced. However, in this digital recording/reproduction apparatus, since the respective I, P, and B pictures are not successively reproduced at the trick playback such as the reverse playback or the time search, the I picture is not always reproduced reliably. When the I picture cannot be reproduced reliably, the P and B pictures using the prediction coding cannot be reproduced either. That is, input image data which is intra-picture/inter-picture coded like MPEG, does not have a uniform data amount for each picture, and with respect to the image data which is inter-picture coded, decoding of image signals cannot be performed directly. Therefore, when the data which is inter-picture coded is recorded on the recording medium and the trick playback such as the reverse playback or time search is performed, only a part of the data on the recording medium is reproduced or reading from the recording medium is late for the reproduction, whereby image data cannot be reproduced reliably.

Japanese Published Patent Application No.Hei.9-247623 discloses a "recording/reproduction apparatus" comprising: recorded data reconstruction means for selecting, from video coded data which is obtained by multiplexing intra-frame coded data and inter-frame coded data, the intra-frame coded data and its accompanying header information and program information describing contents of the coded data, to reconstruct the intra-frame coded data and its accompanying header information and the program information; recording means for recording an output from the recorded data reconstruction means in a predetermined position on a recording medium; reproduction means for reproducing the data recorded on the recording medium by the recording means at a predetermined double-speed, to output reproduced data; and reproduced data reconstruction means for selecting the intra-frame coded data and its accompanying header information and the program information, which is reconstructed and recorded, from the output of the reproduction means, to store and reconstruct the same. This recording/reproduction apparatus detects intra-picture coded image data, creates new image data for each trick playback speed, and records plural pieces of image data for trick playback, separately from data for the normal playback. Therefore, this "recording/reproduction apparatus" has a complicated circuit configuration for creating new intra-picture coded image data for each trick playback speed, and further records plural pieces of trick playback image data separately from the normal playback data. Therefore, the amount of data recorded on the recording medium is enormous.

SUMMARY OF THE INVENTION

It is an object of the present invention to provide a digital recording/reproduction apparatus which can reliably obtain intra-picture coded data and perform trick playback smoothly, without complicating a circuit configuration or significantly increasing a data amount on the recording medium.

Other objects and advantages of the present invention will become apparent from the detailed description and specific embodiments described are provided only for illustration since various additions and modifications within the spirit and scope of the invention will be apparent to those of skill in the art from the detailed description.

According to the present invention, a digital recording/reproduction apparatus for recording/reproducing digital image data, by storing a PES packet in which intra-picture coded data and inter-picture coded data which are compressed digital image data are multiplexed and packetized, on a recording medium by PES packet storing means, as well as reading the PES packet stored on the recording medium by PES packet reading means, comprises: PES header detection means for detecting a video PES header from the PES packet recorded on the recording medium; I picture detecting means for detecting intra-picture coded data from a data part of the PES packet recorded on the recording medium; a counter for determining the number of digital image data in the data part of the PES packet recorded on the recording medium; index file creation means for creating an index file containing header information of the PES packet obtained from the output of the PES header detection means, information indicating the intra-picture coded data obtained from the output of the I picture detection means, and information of the number of the digital image data obtained from the output of the counter; index file storage means for recording the index file created by the index file creation means, on the recording medium; user interface control means for receiving a playback command as an input; index file reading means for reading the index file recorded on the recording medium; and navigation control means for, when a trick playback command is input to the user interface control means, instructing the index file reading means to read the index file on the recording medium to obtain the index file via the index file reading means, referring to the header information of the PES packet to be trick-played, the information indicating the intra-picture coded-data, and the information of the number of the digital image data, in the index file, and controlling reproduction of the digital image data recorded on the recording medium, in accordance with types of the trick playback command input to the user interface control means. Thereby, in the trick playback process, the intra-picture coded data can be obtained reliably from the PES packet which is trick-played. Therefore, the inter-picture coded data using the prediction coding can also be reproduced reliably, whereby the trick playback can be performed smoothly without the loss or delay of image data.

Further, on a recording side of the apparatus, the index file for indicating the intra-picture coded data in the PES packet is created by the index file creation means, to perform the trick playback smoothly. This index file is created on the basis of the information obtained from the outputs of the PES header detection means, the I picture detection means, and the counter. Therefore, this can be realized by a simpler configuration than that of an apparatus which creates plural pieces of image data for trick playback separately from image data for normal playback, such as the "recording/reproduction apparatus" disclosed in Japanese Published Patent Application No.Hei.9-247623. Besides, the index file is only-index information of the video PES header or the intra-picture coded data position in the PES packet or the like. Therefore, the data capacity occupied by the index file on the recording medium is reduced.

Furthermore, on a reproduction side of the apparatus, in the trick playback process such as the reverse playback or time search, the intra-picture coded data position in the PES packet is obtained from the index file by the navigation control means. Thereby, the intra-picture coded data can be obtained reliably from the PES packet which is trick-played. Therefore, the inter-picture coded data using the prediction coding can also be reproduced reliably, whereby the trick playback can be performed smoothly without the loss or delay of the image data.

DETAILED DESCRIPTION OP THE PREFERRED EMBODIMENTS

Hereinafter, an embodiment of the present invention will be described.

This embodiment describes a case where the present invention is-applied to a digital recording/reproduction apparatus for recording/reproducing an audio or video PES packet included in a MPEG2 transport stream in the CS broadcasting to/from a recording medium.

Figure 1:
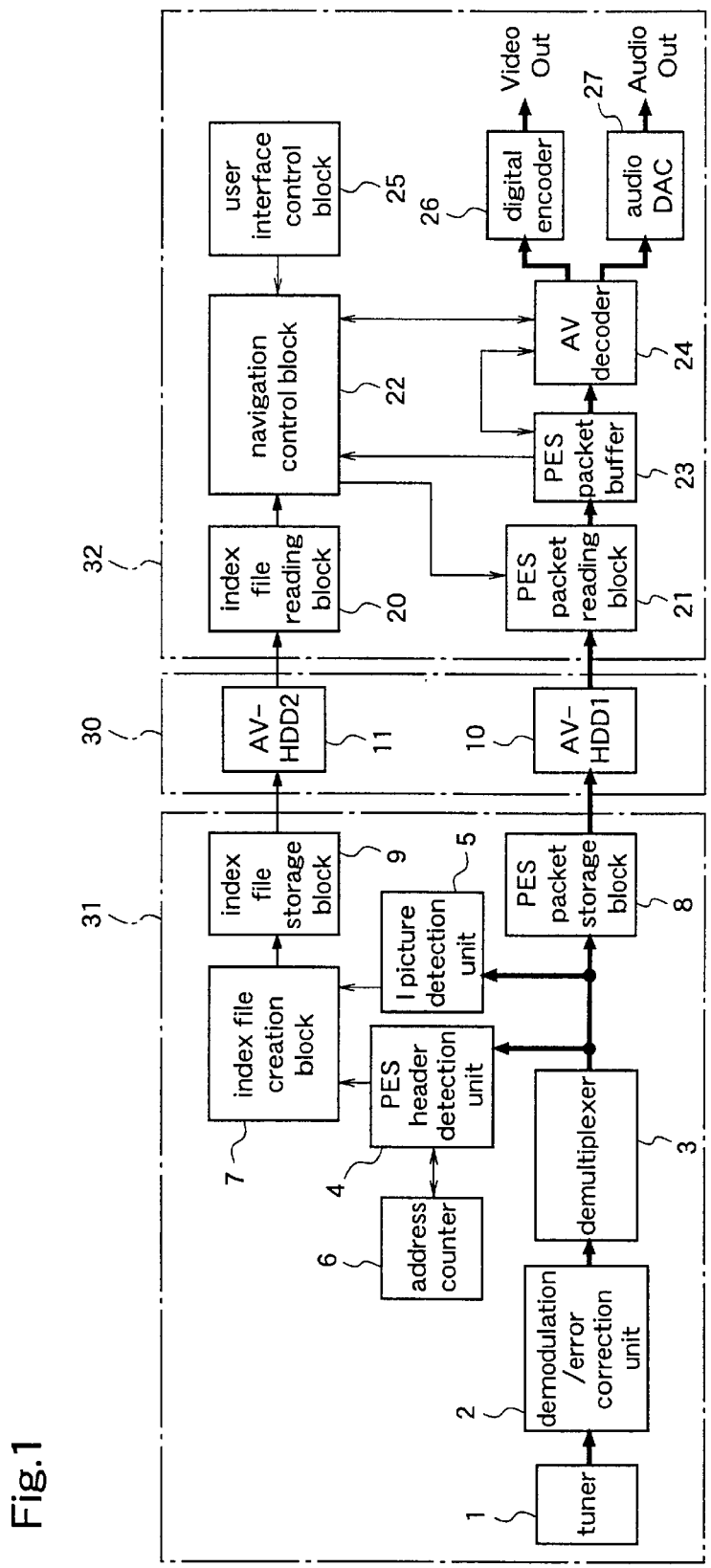
FIG. 1 is a block diagram illustrating a digital recording/reproduction apparatus according to an embodiment of the present invention.

FIG. 1 is a block diagram illustrating a digital recording/reproduction apparatus according to this embodiment.

As shown in FIG. 1, the digital recording/reproduction apparatus of this embodiment comprises a recording medium 30 for storing an audio or video PES packet included in a MPEG2 transport stream, a recording device 31 for recording the PES packet on the recording medium 30, and a reproduction device 32 for reproducing the. PES packet stored in the recording medium 30.

The recording medium 30 comprises an A/V-HDD 1 (10) and an A/V-HDD 2 (11). The A/V-HDD 1 (10) is a recording medium for storing an audio or video PES packet. The A/V-HDD 2 (11) is a recording medium for storing an index file for performing trick playback of the audio or video PES packet stored in the A/V-HDD 1 (10).

The recording device 31 comprises a tuner 1, a demodulation/error correction unit 2, a demultiplexer unit 3, a PES header detection unit 4, an I picture detection unit 5, an address counter 6, an index file creation block 7, a PES packet storage block 8, and an index file storage block 9.

The tuner 1 selects the frequency of one transponder in which programs to be recorded on the recording medium 30 are multiplexed, and outputs a bitstream in the selected one transponder to the demodulation/error correction unit 2. The demodulation/error correction unit 2 performs demodulation and error correction for the bitstream input from the tuner 1, converts the same into a transport stream (TS) defined by MPEG2 system, and output the TS to the demultiplexer unit 3. The demultiplexer unit 3 demultiplexes an audio or video PES packet of one program from the TS input from the demodulation/error correction unit 2, and outputs the PES packet to the PES header detection unit 4, the I picture detection unit 5, and the PES packet storage block 8, respectively. The PES packet storage block 8 records the audio or video PES packet input from the demultiplexer unit 3, in the A/V-HDD 1 (10). The PES header detection unit 4 detects a PES header from the video PES packet input by the demultiplexer unit 3, and outputs a leading address of the video PES packet and PTS (Presentation Time Stamp) information, which are included in the PES header, to the index-file creation block 7. In this case, the PTS is time management information for reproduced output, and when a STC (System Time Clock) in a reference decoder according to MPEG system coincidences with the PTS, its access unit is reproduced and output. The address counter 6 determines the number of data in the video PES packet, when the PES header detection unit 4 detects the PES header. The I picture detection unit 5 detects an I picture from the video PES packet input by the demultiplexer unit 3, and outputs starting point and endpoint information of the I picture to the index file creation block 7. The index file creation block 7 creates an index file of the video PES packets on the basis of respective information input from the PES header detection unit 4 and the I picture detection unit 5. The index file storage block 9 records the index file created by the index file creation block 7 in the A/V-HDD 2 (11).

The reproduction device 32 comprises a user interface control block 25, an index file reading block 20, a PES packet reading block 21, a navigation control block 22, a PES packet buffer 23, an A/V decoder 24, a digital encoder 26, and an audio DAC 27.

The user interface control block 25 receives a playback command for normal play or trick play, entered by a user, and outputs the entered playback command for normal play or trick play to the navigation control block 22. The index file reading block 20 extracts an index file from the A/V-HDD 2 (11) in accordance with an instruction from the navigation control block-22 when the trick playback command occurs in the user interface control block 25, and outputs the index file to the navigation control block 22. The PES packet reading block 21 extracts an audio or video PES packet from the A/V-HDD 1 (10), and outputs the PES packet to the PES packet buffer 23. When the normal playback command is generated in the user interface control block 25, the navigation control block 22 instructs data transfer from the A/V-HDD 1 (10) to the PES packet reading block 21 according to an available space in the PES packet buffer 23. In addition, when the trick playback command is generated in the user interface control block 25, the navigation control block 22 obtains I picture information from the index file obtained from the index file reading block 20, and instructs transfer data from the A/V-HDD 1 (10) to the PES packet reading block 21 on the basis of the I picture information. The PES packet buffer 23 outputs PES packet data input by the PES packet reading block 21, to the A/V decoder 24, upon receipt of a request signal from the A/V decoder 24. The A/V decoder 24 decodes the audio or vide PES packet data input by the PES packet buffer 23, and outputs the video data to the digital encoder 26 and the audio data to the audio DAC 27, respectively. The digital encoder 26 converts the video data received from the A/V decoder 24 into a television output signal, and outputs the signal to the outside. The audio DAC 27 converts the audio data received from the A/V decoder 24 into an analog signal, and output the signal to the outside. Next, an index file of the video PES packets, which is created by the index file creation block 7, will be described.

Figure 2:
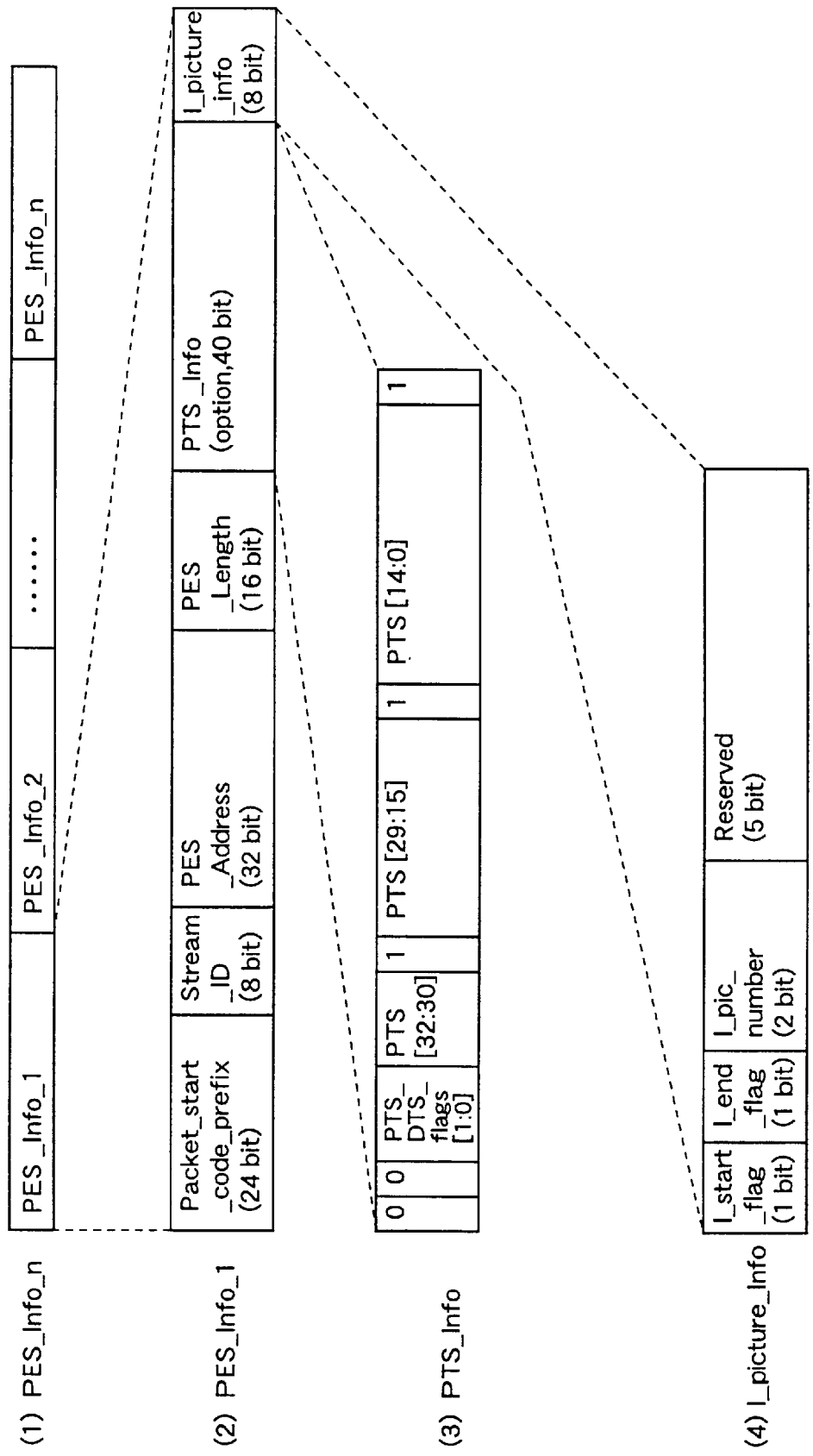
FIG. 2 is a configuration diagram illustrating a data format of an index file.

FIG. 2 is a diagram illustrating a data format of the index file of the video PES packets.

As shown in FIG. 2(1), the index file comprises a hierarchical structure of PES_Info_n (n=0, 1, . . . , N), each indicating header information of each video PES packet. In PES_Info_n, packet_start_code_prefix, stream_ID, PES_Address, PES_Length, PTS_Info, and I_picture_ info are set, as shown in FIG. 2(2). The packet_start_ code_prefix, stream_ID, PES_Address, PES_Length, and PTS_Info are transmitted from the PES header detection unit 4, and the I_picture_info is transmitted from the I picture detection unit 5.

Here, the packet_start_code_prefix and stream_ID are information included in the PES header of the video PES packet.

The packet start_code_prefix is a code indicating the head of the PES packet.

The stream_ID is an ID indicating what kind of data is included in the detected PES packet. When a value of the stream_ID is from 0×E0 to 0×EF, it is shown that the detected PES packet is a video PES packet including data of ITU-T Rec.H.222.0 [ISO/IEC13818-2 (MPEG2 video) or ISO/IEC11172-2 (MPEG1 video).

The PES_Address value is the number of bytes in the PES packet, which is determined by the address counter 6.

The PES_Length defines the number of bytes in a PES packet following the last byte in a PES_packet_length field, and the number of bytes of the PES packet is obtained by adding "6", to the PES_packet_length value. Further, when the PES_packet_length value is "0", it is shown that the PES packet length is not defined and the PES packet has no boundary. When the PES_packet_length value is "0", the PES_Length value is a difference between a start address of a video PES whose index is created, and a start address of a PES packet which will be detected next.

In the PTS_Info, PTS_DTS_flags and PTS data in the video PES packet are set, as shown in FIG. 2(3). This PTS_Info is added to the index only when the video PES packet includes the PTS data, in accordance with a value of the PTS_DTS_flags. The PTS_DTS_flags is information indicating whether the video PES packet includes the PTS data.

The I_picture_info shows an index for an I picture in the video PES packet, and I_start_flag, I_end_flag and I_pic_number are set in the I_picture_info as shown in FIG. 2(4). "Reserved" which follows the I_pic_number shows an available space. The I_start_flag is information indicating how many heads of I picture data are included in the video PES packet. As the I_start_flag, the number of detection of the I picture data heads in the video PES packet whose index is created, detected by the I picture detection unit 5, is set. The I_end_flag is information indicating how many lasts of I picture data are included in the video PES packet. As the I_end_flag, the number of detection of I picture data lasts in the video PES packet whose index is created, detected by the I picture detection unit 5, is set. The I_pic_number indicates how, many I pictures are included in the video PES packet. Here, I pictures whose data is interrupted are not included. For example, in a video PES packet in which values of I_start_flag and I_end_flag are both "0b01", and one I picture head part and one I picture last part are included, when the I_pic number value is "0", it is shown that parts of two I pictures are included in the video PES packet. When the I_pic_number value is "1", it is shown that one I picture data is included in the video PES packet. Usually, a video PES packet including I picture data includes only part of one I picture data. For example, when the I_start_flag value is "1" and the I_end_flag value is "0", the PES packet including I picture data includes the head part of the I picture data. When the I_start_flag value is "0" and the I_end_flag value is "1", the PES packet includes the last part of the I picture data. Further, when both of the I_start_flag value and the I_end_flag value are "0", the PES packet includes a middle part, including neither head nor last of the I picture data. In any of these cases, the I_pic_number value is "0".

Next, an operation of recording/reproducing an audio or video PES packet will be described.

Initially, a description is given of the recording operation with reference to FIG. 1.

At the recording process, the tuner 1 selects the frequency of one transponder in which programs to be recorded on the recording medium 30 are multiplexed, and outputs a bitstream having one program or plural programs multiplexed in the selected one transponder, to the demodulation/error correction unit 2. The demodulation/error correction unit 2 performs demodulation and error correction for the bitstream input from the tuner 1, converts the same into a transport stream (TS) defined by ITU-T Rec.H.222.0 |ISO/IES13818-2 (MEPG2 system), and output the TS to the demultiplexer unit 3. The demultiplexer unit 3 demultiplexes, from the input TS, an audio or video PES packet of one program to be recorded in the recording medium 30, and outputs the PES packet to the PES header detection unit 4, the I picture detection unit 5, and the PES packet storage block 8, respectively. The PES packet storage block 8 records the audio or video PES packet output by the demultiplexer unit 3, in the A/V-HDD 1 (10).

Next, a description is given of a method for creating an index file for performing a trick playback of an audio or video PES packet recorded in-the A/V-HDD 1 (10).

Figure 3:
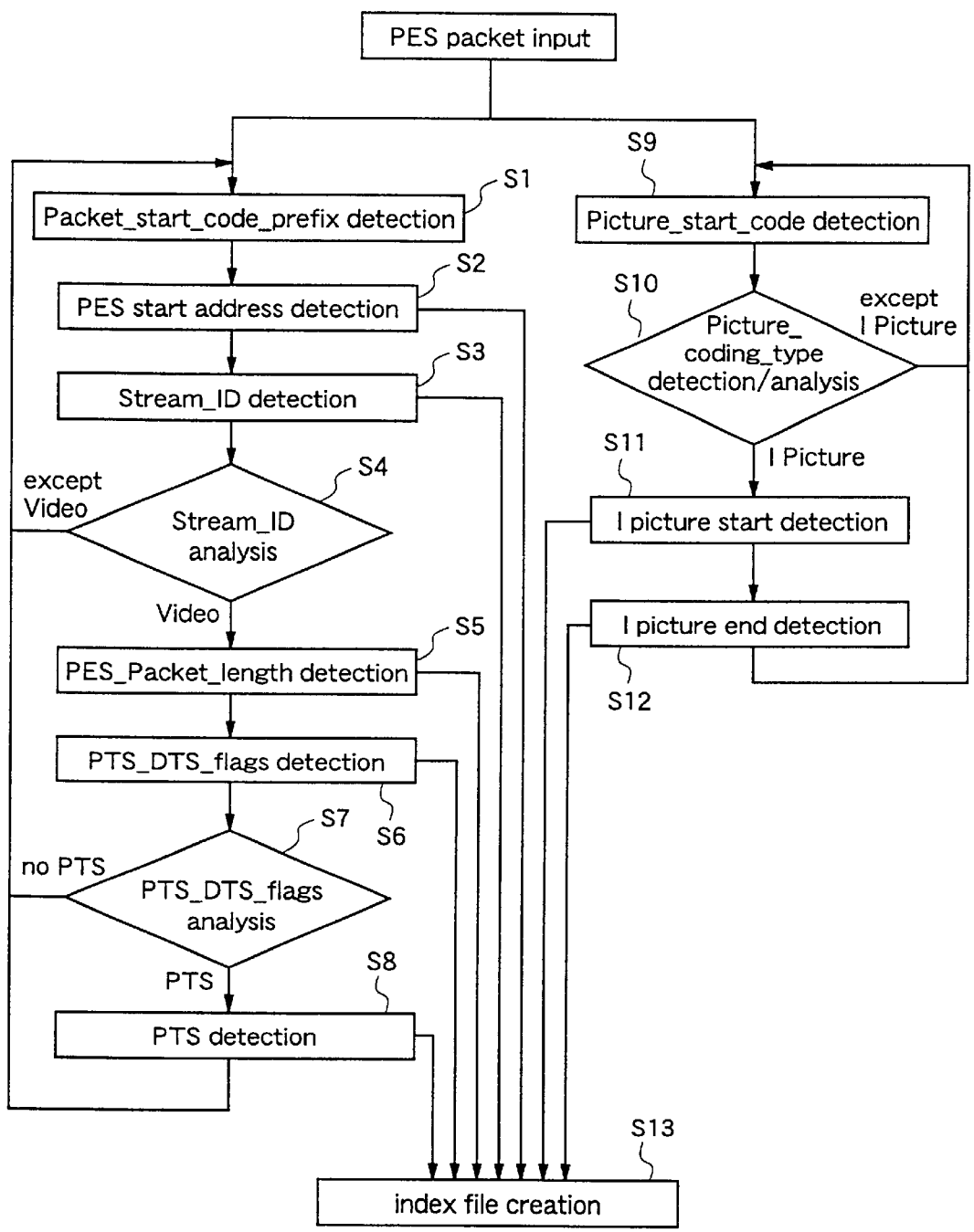
FIG. 3 is a flowchart showing an operation of an index file creation block and how to create the index file.

FIG. 3 is a flowchart showing a procedure of creating the index file for performing the trick playback. In FIG. 3, steps S1 to S8 show operation steps by the PES header detection unit 4 and the address counter 6, steps S9 to S12 show operation steps by the I picture detection unit 5, and step S13 shows an operation step by the index file creation block 7.

In step S1, the PES header detection unit 4 detects packet_start_code_prefix comprising 24 bits and having a value of 0×00001 (x=0 or 1) from an audio or video PES packet which is output by the demultiplexer unit 3, and thereby detects the head of the PES packet.

In step S2, the address counter 6 determines the number of bytes of the PES packet data existing before the packet_start_code_prefix of the PES packet detected by the PES header detection unit 4. Then, the PES header detection unit 4 obtains the number of bytes of the PES packet from the address counter 6, and outputs the packet_start_code_prefix indicating the head address of the PES packet to the index creation block 7. The address counter 6 is reset to "0" while the recording of the PES packet is not performed, and counts up the number of bytes of the PES packet to be recorded during the recording of the PES packet.

In step S3, the PES header detection unit 4 detects a stream_ID of 8 bits immediately after the packet_start_code_prefix, and output this stream_ID to the index file creation block 7. The stream_ID is an ID indicating what kind of data is included in the detected PES packet. When a value of the stream_ID is from 0×E0 to 0×EF, it is shown that the detected packet is a video PES packet including data of ITU-T Rec.H.222.0 ISO/IEC13818-2 (MEPG2 video) or ISO/IES11172-2 (MPEG1 video).

In step S4, the PES header detection unit 4 analyzes the stream_ID detected in step S3. When the stream_ID value is from 0×E0 to 0×EF and the detected PES packet is a video PES packet, it proceeds to step S5, and when a PES packet except a video PES packet is detected, it returns to step S1 and wait for input of a next PES packet.

In step S5, the PES header detection unit 4 detects a PES_packet_length of 16 bits immediately after the stream_ID, and outputs the PES_packet_length to the index file creation block 7. The PES_packet_length defines the number of bytes in a PES packet following the last byte in the PES_packet_length field, and the number of bytes of the PES packet is obtained by adding "6" to the PES_packet_length value. In addition, when the PES_packet_length value is "0", it is shown that the PES packet length is not defined and the PES packet has no boundary.

In step S6, the PES header detection unit 4 detects a PTS_DTS_flags of 2 bits, to judge the presence or absence of PTS information in the detected video PES packet.

In step S7, the PES header detection unit 4 analyzes the PTS_DTS_flags detected in step S6. When the PTS_DTS_flags value is 0b10 or 0b11, it is shown that the detected video PES packet includes the PTS information, and other cases show that the detected video PES packet includes no PTS information. Then, when the PTS_DTS_flags value is 0b10 or 0b11 and the detected PES packet includes the PTS information, the PES header detection unit 4 proceeds to step S8, and when the detected PES packet includes no PTS information, it returns to step Si and wait for input of a next PES packet.

In step S8, the PES header detection unit 4 detects the PTS information from the video PES packet, and outputs the detected PTS information to the index file creation block 7.

On the other hand, in step S9, the I picture detection unit 5 detects a picture_start_code comprising 32 bits and having a value of 0×00000100 from the video PES packet output by the demultiplexer unit 3, and detects the head of picture data.

In step S10, the I picture detection unit 5 performs detection and analysis of a picture_coding_type of 3 bits included in a byte immediately after the picture_start_code. When the picture_coding_type is 0b001, i.e., an I picture, it proceeds to step S11, and when the picture_coding_type is other than the I picture, it returns to step S9 and waits for input of a next PES packet.

In step S11, when the I picture is detected in step S10, the I picture detection unit 5 outputs the start of the I picture to the index file creation block 7.

In step S12, when the I picture detection unit 5 detects one of a sequence_header_code, group_start_code, picture_start_code, and sequence_end_code, after detecting the I picture, the unit 5 outputs the end of the I picture data to the index file creation block 7.

Then, in step S13, the index file creation block 7 creates an index file of video PES packets, as for the video PES packets detected by the PES header detection unit 4 from when the I picture detection unit 5 detects the start of I picture data in step S11 until the unit 5 detects the end of the I picture data in step S12. The created index file is stored in the A/V-HDD 2 (11) by the index file storage block 9.

Next, a reproduction operation by the digital recording/reproduction apparatus of this embodiment will be described.

First, an operation at the normal play process is described.

When a normal playback command is input to the user interface control block 25 shown in FIG. 1 and the normal playback command occurs in the user interface control block 25, the navigation control block 22 instructs the data transfer to the PES packet reading block 21 according to an available space in the PES packet buffer 23. The PES packet reading block 21 extracts an audio or video PES packet from the A/V-HDD 1 (10), and output the PES packet data to the PES packet buffer 23. The PES packet buffer 23 receives a PES packet request signal from the A/V decoder 24, and outputs the PES packet data to the A/V decoder 24. The A/V decoder 24 decodes the audio or video PES packet data input from the PES packet buffer 23, and outputs the video data to the digital encoder 26 and the audio data to the audio DAC 27, respectively. The digital encoder 26 converts the video data received from the A/V decoder 24 into a television output signal, and outputs the signal to the outside. The audio DAC 27 converts the audio data received from the A/V decoder 24 into an analog signal, and output the signal to the outside.

Next, an operation at the trick play process (a fast forward playback, a fast rewind playback, a time skip) will be described.

Figure 4:
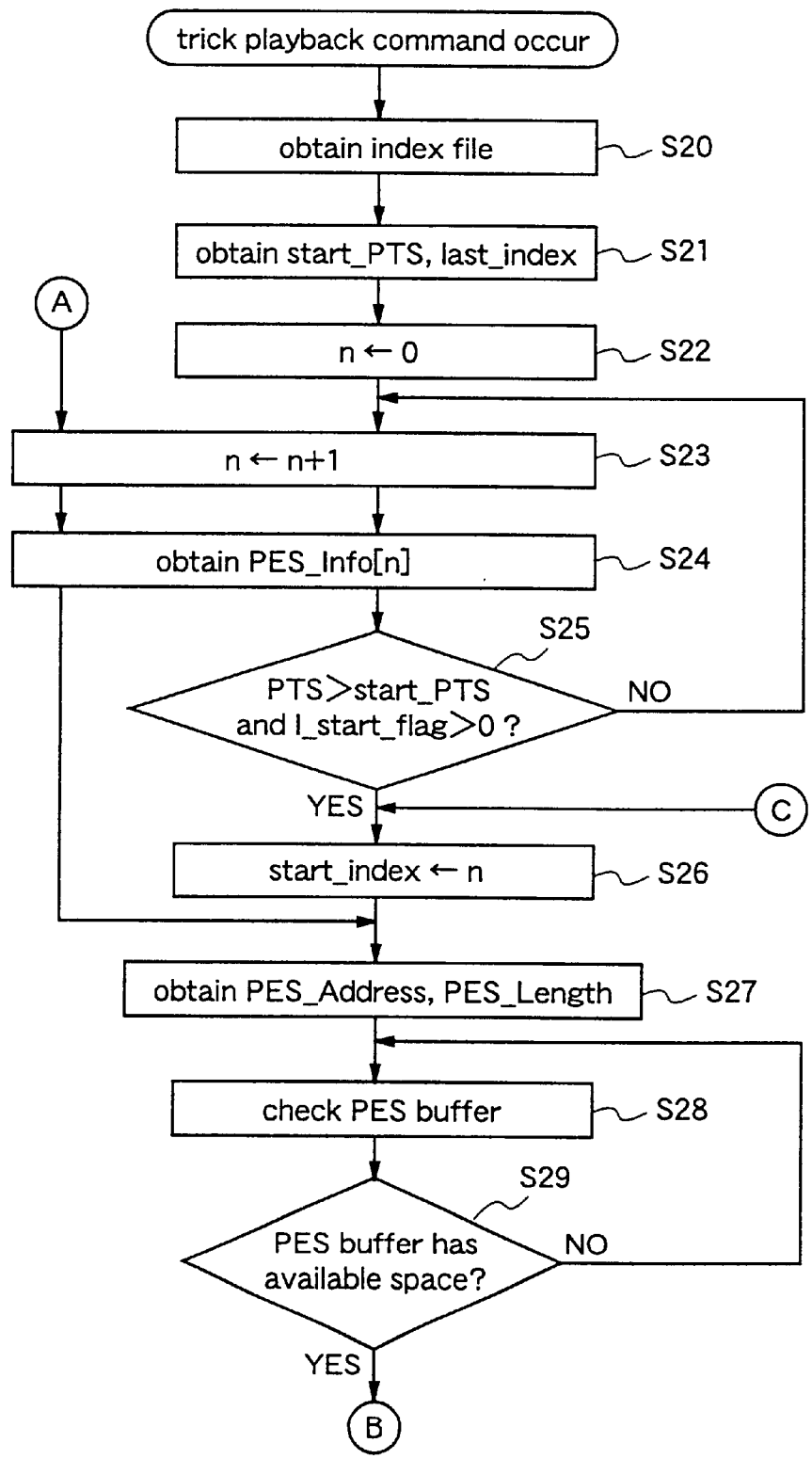
FIG. 4 is a flowchart showing an operation of a navigation control block.
Figure 5:
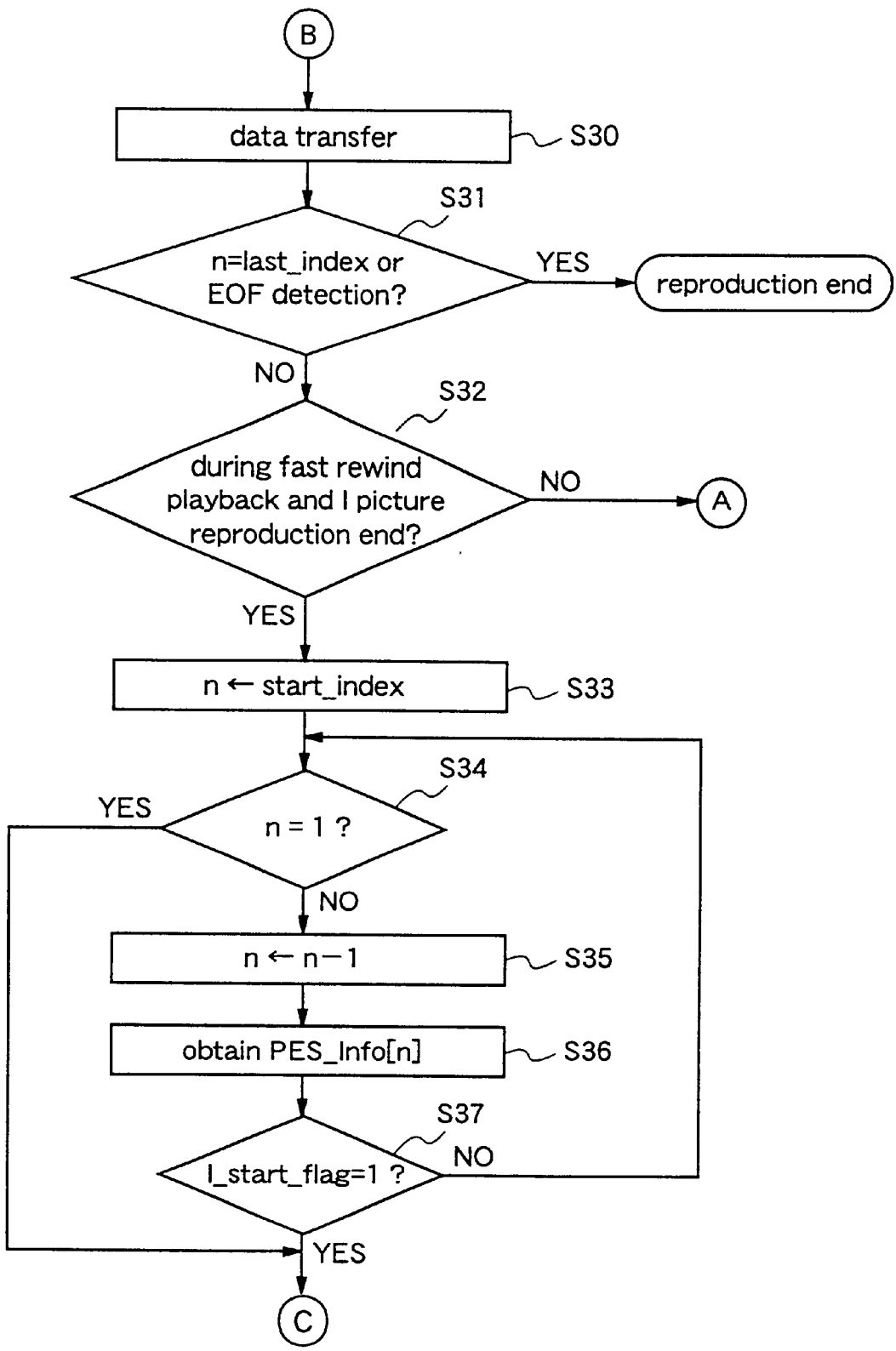
FIG. 5 is a flowchart showing an operation of the navigation control block, following that shown in FIG. 4.
Figure 6:
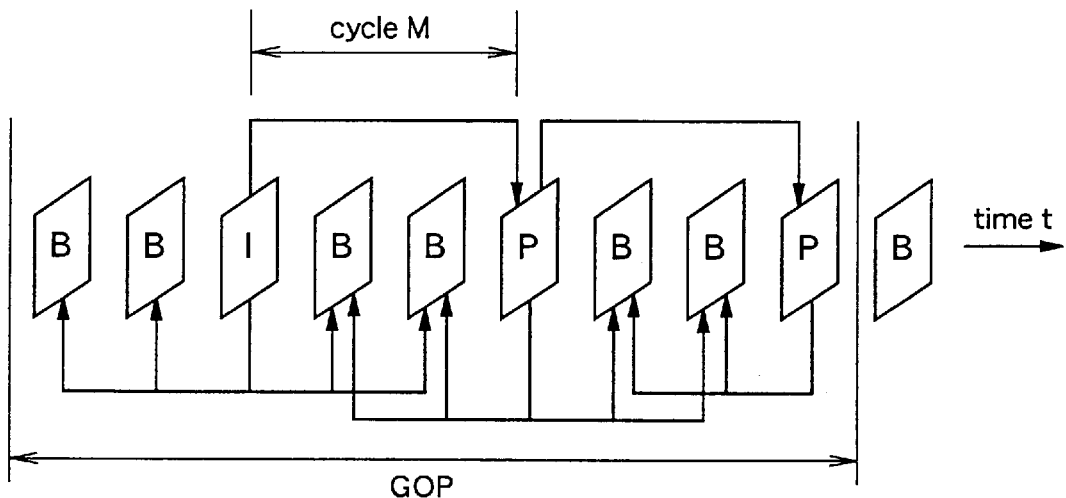
FIG. 6 is a configuration diagram for explaining a GOP according to MPEG2 system.
Figure 7:
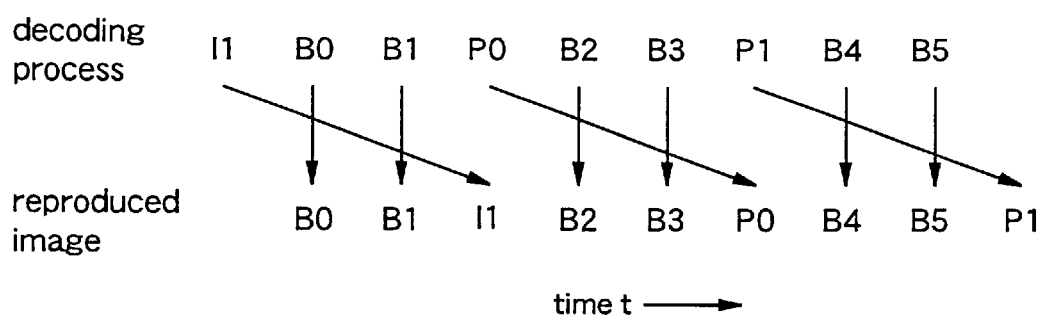
FIG. 7 is a configuration diagram for explaining an image displaying order by a decoding process according to MPEG2 system.

FIG. 4 is a flowchart showing a procedure of the trick playback and FIG. 5 is a flowchart following FIG. 4.

When a trick playback command is input to the user interface control block 25 shown in FIG. 1 and the trick playback command occurs in the user interface control block 25, the navigation control block 22 outputs an instruction to the index file reading block 20 to obtain an index file from the A/V-HDD 2 (11) and stores the index file in its internal memory, in step S20 shown in FIG. 4.

In step S21, when the forward playback is designated in the user interface control block 25, the navigation control block 22 retrieves the index file obtained in step S20, and stores the last PES_Info number as a last_index. When the reverse playback is designated in the user interface control block 25, the navigation control block 22 stores the first PES_Info number of the index file, i.e., "1" as a last index.

When the time skip is designated in the user interface control block 25, the navigation control block 22 takes a PTS changed from a designation time in the user interface control block 25, as a value of a start_PTS indicating a playback start time. On the other hand, when the time skip is not designated and the reproduction apparatus 32 are now performing playback, the navigation control block 22 obtains a PTS from the A/V decoder 24 and takes the PTS as a value of the start_PTS indicating the playback start time. Further, when the reproduction apparatus 32 is not performing playback, the navigation control block 22 takes "0" indicating execution of the playback start from the beginning, as a value of the start_PTS indicating the playback start time.

In step S22, the navigation control block 22 assigns 0 to "n" which is a variable for distinguishing the PES_Infos in the index file.

In step S23, the navigation control block 22 increments "n" as the variable for distinguishing the PES_Infos in the index file.

In step S24, the navigation control block 22 obtains a PES_Info indicated by "n" which is the variable for distinguishing the PES_Infos in the index file, from the index file.

In step S25, the navigation control block 22 extracts a PTS and an I_start_flag from the PES_Info obtained in step S24, and compares the extracted PTS with the start_ PTS obtained in step S21. When the start_PTS is smaller than the PTS and the I_start_flag extracted from the PES_Info is not "0", it proceeds to next step S26. On the other hand, when the navigation control block 22 compares the PTS extracted from the PES_Info with the start_PTS obtained in step S21, and both are equal or the start_PTS is larger than the PTS, or the I_start_flag extracted from the PES_Info is "0", it returns to step S23.

In step S26, the navigation control block 22 assigns the value "n" containing a PES_Info number which includes address information of data which is started to be transferred, to a variable "start_index" indicating a PES_ Info which includes a head address of an I picture to be reproduced.

In step S27, the navigation control block 22 obtains a PES_Address and a PES_Length, from the PES_Info indicated by "n" which is the variable for distinguishing the PES_Infos. Then, the navigation control block 22 takes a start address of PES packet data obtained from the A/V-HDD 1 (10) as the PES_Address, and an end address of the PES packet data obtained from the A/V-HDD 1 (10) as a value which is obtained by adding the PES_Address and the PES_Length. In the case of time skip, the navigation control block 22 does not set the end address. At this time, the data transfer from the A/V-HDD 1 (10) is repeated until an EOF is detected by the PES packet reading block 21 or a reproduction stop command is generated by the user interface control block 25.

In step S28, the navigation control block 22 checks whether the PES packet buffer 23 has a buffer capacity allowing the data transfer.

In step S29, when it is decided that the PES packet buffer 23 has the buffer capacity allowing the data transfer by the check in step S28, the navigation control block 22 proceeds to step S30, and when the PES packet buffer 23 does not have the buffer capacity allowing the data transfer, it returns to step S28.

Referring to FIG. 5, in step S30, the navigation control block 22 instructs to the PES reading block 21 to execute data transfer from the A/V-HDD 1 (10) to the PES packet buffer 23, on the basis of the start address and end address obtained in step S27.

In step S31, when "n" as the variable for distinguishing the PES_Infos is compared with the last_index indicating the last PES_Info in the index file and the result shows that they are equal, or the PES packet reading block 21 detects a EOF indicating a termination of a file, the navigation control block 22 performs a reproduction stop process and ends the reproduction. When "n" as the variable for distinguishing the PES_Infos is compared with the last_index indicating the last PES_Info in the index file and the results shows that they are not equal, or the PES packet reading block 21 does not detect the EOF indicating the termination of the file, the navigation control block 22 proceeds to step S32.

In step S32, when the fast forward playback is being performed at that time, it proceeds to step S23. During the fast rewind playback process, when the I_end_flag is 0, or the I_pic_number is 0 and the start_index as the variable for indicating the PES_Info including the head address of the I picture and "n" as the variable for distinguishing PES_Infos are equal, it proceeds to step S23. When the I_end flag is not 0, and the I pic number is not 0 or the start_index as the variable for indicating the PES_Info including the head address of the I picture and "n" as the variable for distinguishing the PES_Infos are not equal, it proceeds, to step S33.

In step S33, the navigation control block 22 assigns the value of the start index indicating the PES_Info including the head address of the I picture, to "n" as the variable for distinguishing the PES_Infos.

In step S34, when "n" as the variable for distinguishing the PES_Infos is equal to the head PES_Info number in the index file, i.e., 1, the navigation control block 22 proceeds to.step S26, and when it is not equal to 1, it proceeds to step S35.

In step S35, the navigation control block 22 decrements "n" as the variable for distinguishing the PES_Infos.

In step S36, the navigation control block 22 obtains a PES_Info indicated by "n" as the variable for distinguishing the PES_Infos in the index file, from the index file.

In step S37, when the I_start_flag extracted from the PES_Info is "1", the navigation control block 22 proceeds to S26, and when it is "0", it proceeds to step S34.

As described above, in the digital recording/reproduction apparatus according to this embodiment, an index file for indicating a position of an I picture in the i PES packet recorded in the A/V-HDD 1 (10) is created by the index file creation block 7 and this index file is stored in the A/V-HDD 2 (11). Thereby, in the case of trick playback such as the reverse playback or time search, the navigation control block 22 obtains I picture information from the index file, whereby the I picture can be reliably obtained from the PES packet to be trick-played, and reproduced. Therefore, P pictures or B pictures using the prediction coding can also be reproduced reliably, whereby the trick playback can be performed smoothly without loss or delay of image data.

In addition, the index file for performing the trick playback smoothly is only index information of the PES packet and it does not significantly increase data capacity, unlike the image data for trick playback in the "recording/reproduction apparatus" disclosed in Japanese Published Patent Application No.Hei.9-247623. Therefore, the capacity occupied by the index file on the recording medium is reduced.

In this embodiment, the index file is stored in the A/V-HDD 2 (11). However, the index file can be stored in the A/V-HDD 1 (10) and thus the A/V-HDD 2 (11) can be omitted.

What is claimed is:

1. A digital recording/reproduction apparatus for recording/reproducing digital image data, by storing a PES packet in which intra-picture coded data and inter-picture coded data which are compressed digital image data are multiplexed and packetized, on a recording medium by PES packet storing means, as well as reading the PES packet stored on the recording medium by PES packet reading means, comprising:

PES header detection means for detecting a video PES header from the PES packet recorded on the recording medium;

I picture detecting means for detecting intra-picture coded data from a data part of the PES packet recorded on the recording medium;

a counter for determining the number of digital image data in the data part of the PES packet recorded on the recording medium;

index file creation means for creating an index file containing header information of the PES packet obtained from the output of the PES header detection means, information indicating the intra-picture coded data obtained from the output of the I picture detection means, and information of the number of the digital image data obtained from the output of the counter;

index file storage means for recording the index file created by the index file creation means, on the recording medium;

user interface control means for receiving a playback command as an input;

index file reading means for reading the index file recorded on the recording medium; and navigation control means for, when a trick playback command is input to the user interface control means, instructing the index file reading means to read the index file on the recording medium to obtain the index file via the index file reading means, referring to the header information of the PES packet to be-trick-played, the information indicating the intra-picture coded data, and the information of the number of the digital image data, in the index file, and controlling reproduction of the digital image data recorded on the recording medium, in accordance with types of the trick playback command input to the user interface control means.

2. The digital recording/reproduction apparatus of claim 1 wherein the PES header detection means further detects a time stamp included in the video PES header of the PES packet.

* * * * *